June 3, 1952

K. W. HARRISON 2,598,996

ELECTRIC CARRIER WAVE SIGNALING SYSTEM

Filed May 7, 1946

2 SHEETS—SHEET 1

Inventor:
Kenneth Whiteley Harrison,
by Pierce & Scheffler,
Attorneys.

June 3, 1952 K. W. HARRISON 2,598,996

ELECTRIC CARRIER WAVE SIGNALING SYSTEM

Filed May 7, 1946 2 SHEETS—SHEET 2

Inventor:
Kenneth Whiteley Harrison,
by Pierce & Scheffler,
Attorneys.

Patented June 3, 1952

2,598,996

UNITED STATES PATENT OFFICE 2,598,996

ELECTRIC CARRIER WAVE SIGNALING SYSTEM

Kenneth Whiteley Harrison, London, England, assignor to Telephone Manufacturing Company Limited, West Dulwich, London, England Application May 7, 1946, Serial No. 667,823
In Great Britain May 28, 1945

11 Claims. (Cl. 250—27)

This invention relates to electric wave signalling systems and in particular to receiving circuits for signals consisting of impulses of alternating current, which may be the carrier current in a carrier wave system, or which may be voice frequency signals in a voice frequency telegraph system. Such signals may be used for preceding or following intelligence signals proper or may themselves be the intelligence signals in the case of a telegraph system.

Objects of the invention are to provide receivers for impulse carrier wave signals, which receivers develop output currents significant of the timing of, and substantially independent of variations in the amplitude of, the received impulses. An object is to provide a receiver for impulse carrier wave signals, which receiver includes a vacuum tube having input circuits biased to draw grid current upon the arrival of signal impulses, and which further includes a condenser and voltage variant resistor for maintaining an effectively operative potential upon the tube grid upon the cessation of an arrived impulse. More specifically, an object is to provide a receiver having the characteristics stated, and in which the effective resistance of the resistor is reduced by an incoming signal impulse, thereby permitting charging of the condenser, and is restored to "high value" upon the cessation of the signal impulse, whereby the condenser retains its charge for an appreciable period.

These and other objects and the advantages of the invention will be apparent from the following specification when taken with the accompanying drawings, in which.

Figures 1A, 1B, 1C, 2:
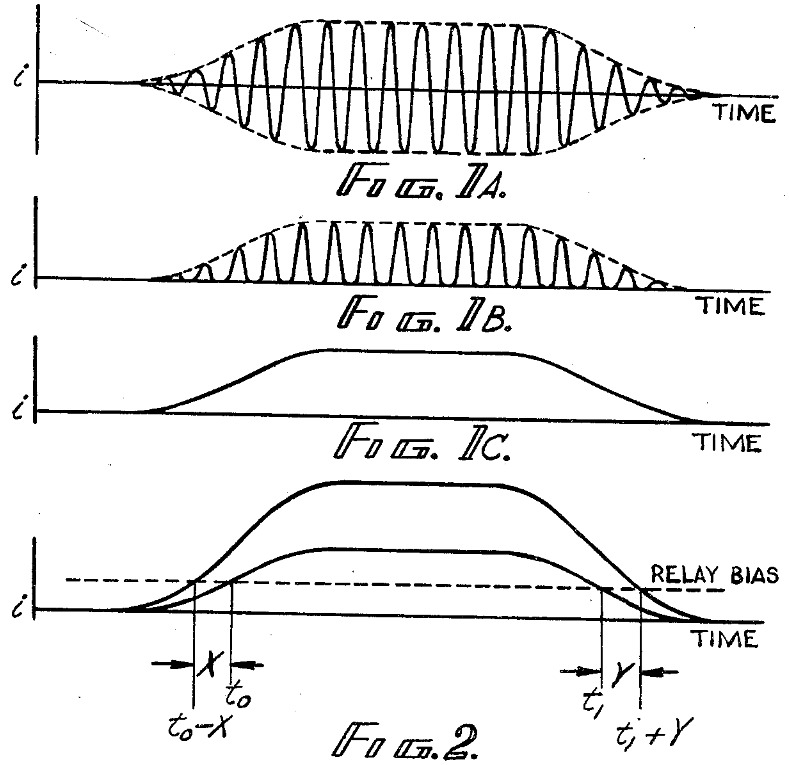
Figs. 1A to 1C are curves showing the wave forms of, respectively, a received signal impulse, a rectified impulse, and filtered rectified impulse as applied to the receiver relay.
Fig. 2 is a curve sheet, for explanatory purposes, showing filtered rectified impulses as developed from received signal impulses of different amplitudes.

The invention will be best understood by considering a system consisting of a source of alternating current of constant frequency, the output of which is interrupted in accordance with a code, such as a telegraphic code, a transmission path which will pass a narrow band of frequencies, a rectifier, a low pass filter, and a receiving relay having controllable bias. If the transmission path has a gradual "cut-off" at each end of the transmitting range, and has linear phase change over the range, then the shape of the received wave will be approximately as shown in Figure 1A of the accompanying explanatory diagrams. Oscillations of this type are not suitable for directly operating the receiving relay and it is therefore necessary to rectify the oscillating currents. The shape of the current wave after rectification is shown in Figure 1B. This rectified current is as yet unsuitable for operating the receiving relay since it rises and falls according to the carrier frequency. This difficulty may be overcome by employing a low-pass filter which strongly attenuates the high-frequency components of the rectified wave and produces a low frequency current wave having smooth variations. Such a filter should pass a band of frequencies at least as wide as the original signal with uniform efficiency and linear phase change. If these conditions are fulfilled and the rectifier introduces no distortion then the output wave would be a current wave the amplitude of which is a delayed replica of the envelope of the rectified currents and would appear as shown in Figure 1C. In practice the filter usually comprises the inductance of the receiving relay with a single condenser in shunt. The receiving relay will operate in one direction whenever the incoming oscillation passes through the value at which the smoothed rectified current just exceeds the receiving relay bias current and will operate in the other direction whenever the oscillation passes through the value at which the smoothed rectified current just falls below the receiving relay bias current. By suitable adjustment of the receiving relay bias current it can be arranged that the time interval between two successive changes of state of the receiving relay is equal to the time interval between two successive changes in state of the key at the send end and the signals are repeated at the receiving end with a uniform delay but with no time distortion.

The major problem in the design of such a system is the unavoidable variations in line attenuation which can occur in practice. The effect upon the time distortion of the reception of the signals of various amplitudes is shown in Figure 2. If the relay is adjusted for correct reception of signals having the smaller amplitude so that the signals are received at times shown as $t_0$ and $t_1$, then, if the amplitude of the rectified current increases to the value shown then the receiving relay will operate at times shown as $t_0-X$ and $t_1+Y$ thus introducing time distortion of $X+Y$.

Figure 3:
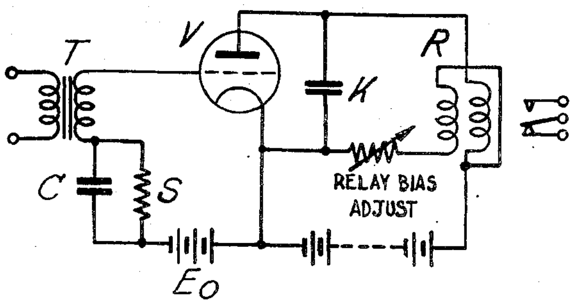
Fig. 3 is a circuit diagram of a receiver relay for operation by signal impulses.

By using a detector whose sensitivity varies with the amplitude of the applied signal it is possible to overcome this difficulty. A simple detector of this type is shown in Figure 3. The circuit comprises an input transformer T in series with a condenser C and a biasing battery $E_0$ of fixed voltage and connected between the grid and cathode of a vacuum tube V. The condenser C is shunted by a resistor S, and in the anode circuit of tube V is the receiving relay R shunted by an appropriate condenser K to form the low-pass filter. The biasing voltage $E_0$ is adjusted so that the tube V is biased substantially to cut-off and the anode current is of negligible magnitude when no signal is being received. The received signals are amplified at such rate before application to the transformer T that, for amplified signals of more than a preselected amplitude level above which compensation is required, a portion of each positive half wave of the carrier frequency is caused to overcome the opposing negative biasing voltage $E_0$ so that during part of the signal interval grid current flows between cathode and grid of the tube V and hence through the resistor S and the condenser C in parallel. By a proper selection of the constants of the circuit the self-bias by grid current can be arranged within limits, to keep the effective grid-cathode voltage due to the signals nearly constant irrespective of their magnitude by setting up a voltage on the condenser which opposes and adds algebraically to the grid bias battery voltage $E_0$ and whose magnitude is automatically adjusted to be proportional to the incoming signals. This action will be such that the steady bias voltage $E_0$ plus the voltage set up across the condenser C will, within limits, produce the right grid bias voltage for undistorted reception of signals by the receiving relay.

In a detector of the type described above a large part of the charge accumulated on condenser C during a marking signal (current to line) would be dissipated in the resistor S during a spacing signal (no current to line), and since both marking and spacing signals continually change in relative lengths this would give rise to characteristic distortion since, for a constant received signal amplitude over an extended period, the grid bias at the initiation of a marking signal will vary with the length of the preceding spacing signal.

Figure 4:
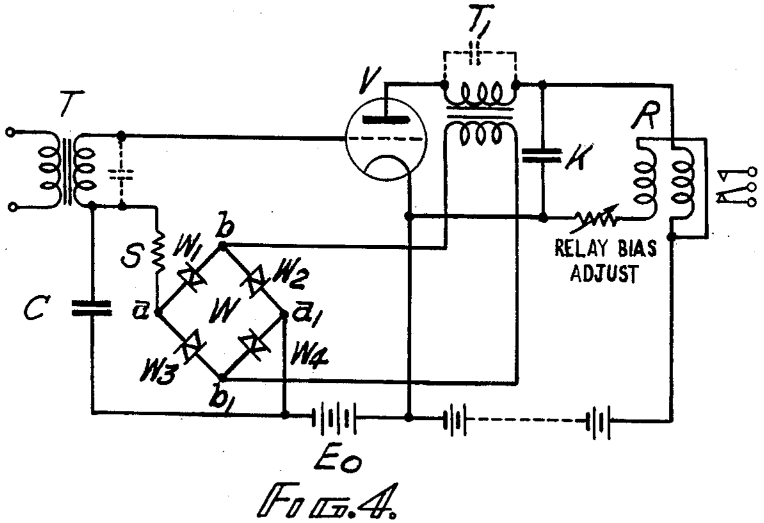
Figs. 4 and 5 are circuit diagrams of different forms of receiver relays embodying the invention.

The present invention provides a static means to prevent the charge accumulated on C during a marking signal from leaking away during a spacing signal and at the same time to arrange for the static control to be operated directly from the signal wave, and a suitable circuit is shown schematically in Figure 4. This circuit comprises an input transformer T in series with a condenser C and a biasing battery $E_0$ of fixed voltage and connected between the grid and cathode of the tube V. The condenser C is shunted by a resistor S in series with the diagonals *a*, *a1* of a bridge W consisting of four elements W1, W2, W3, W4. In the anode circuit of the tube V is a transformer T1 in series with the receiving relay R which is effectively shunted for carrier frequencies by an appropriate condenser K. The secondary of the transformer T1 is connected across diagonals *b*, *b1* of the bridge W. The elements W1, W2, W3, W4 are conductors having characteristics such that their resistance varies in a non-linear manner with the value of the voltage applied to them. These elements are preferably of the silicon carbide type and in general their resistance is very high with a small value of applied voltage and relatively low with a large value of applied voltage. When a signal is applied to the grid of the tube V the carrier component of the signal is amplified and appears across transformer T1 in the anode circuit of the tube V. This alternating voltage is applied across diagonals *b*, *b1* of the bridge W and causes the resistance between diagonals *a*, *a1* to fall to a relatively low value. The condenser C charges rapidly to a value depending upon the grid current flowing through S and automatically adjusts the bias voltage on the grid of tube V to a value proportional to the magnitude of the incoming signal. During a spacing signal the alternating voltage across the diagonals *b*, *b1* of the bridge W falls, the resistance between diagonals *a*, *a1* rises to a high value and the charge accumulated on C during the marking signal is prevented from leaking away rapidly so that the bias on the tube is sustained. By employing a level compensated detector of the type described herein it is possible to maintain the signal characteristic distortion within very close limits despite relatively wide changes in level of the incoming signals.

Figure 5:
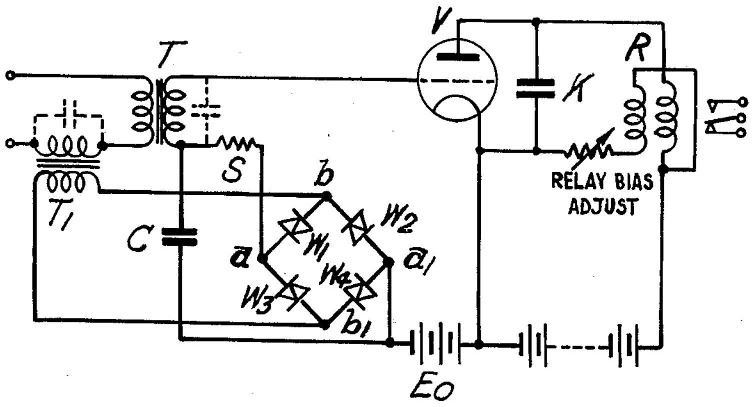

Instead of connecting the transformer T1 in the output circuit of the tube V, the transformer may be fed directly from the input to the tube. Such an arrangement is shown in Figure 5. In this case the circuit comprises the two input transformers T and T1 whose primary windings are connected in series. As in Figure 4 the secondary of the transformer T is in series with condenser C and biasing battery $E_0$ of fixed voltage connected between grid and cathode of tube V. The condenser C is shunted by resistor S in series with the diagonals *a*, *a1* of bridge W consisting of four elements W1, W2, W3, W4. The secondary of the transformer T1 is connected across diagonals *b*, *b1* of the bridge W. In the anode circuit of the tube V is the receiving relay R shunted for carrier frequencies by an appropriate condenser K. When a signal voltage is applied to the grid of the tube V via the transformer T a signal voltage is also applied across the diagonals *b*, *b1* of bridge W via transformer T1 and causes the resistance between diagonals *a*, *a1* to fall to a low value. As with the arrangement of Figure 4 the condenser C charges rapidly to a value depending upon the grid current flowing through S and automatically adjusts the bias voltage on the grid of tube V to a value proportional to the magnitude of the incoming signal. During a spacing signal the alternating voltage across the diagonals *b*, *b1* of the bridge W falls, the resistance between diagonals *a*, *a1* rises to a high value and the charge accumulated on C during the marking signal is prevented from leaking away rapidly. By employing a level compensated detector of the type described herein it is possible to maintain the signal characteristic distortion within very close limits despite relatively wide changes in level of the incoming signals.

Whilst the control voltage is indicated as drawn from a series-connected transformer T1, it will be understood that the controlling voltage can be obtained, directly or indirectly, for example by means of an auxiliary tube, from any points of the signal circuit across which a voltage conditioned by or determined by the signal wave amplitude exists.

It will be understood that whilst the foregoing description of the preferred constructional circuits are given by way of example the invention is not limited in its application to such specific forms of circuit but may be applied by those versed in the art to circuits operating in a similar manner without departing from its essential nature.

It will also be understood that although a triode tube is specifically referred to in the above description the circuit is equally applicable to any type of multi-electrode tube. The transformers T and T1 may or may not be tuned to accept or reject certain particular frequencies and the bridge elements may consist of any type of conductors having characteristics such that their resistance varies with the value of the applied voltage or current.

What I claim and desire to secure by Letters Patent is:

1. A receiver for an impulse carrier wave signal of varying amplitude comprising a vacuum tube having a cathode cooperating with an input electrode and an output electrode, means for impressing said signal upon said input electrode and a load device connected to said output electrode, and means impressing between said control grid electrode and said cathode a steady bias potential substantially suppressing conductance through said tube in the absence of a signal on said input electrode, means operative by a received signal of more than preselected amplitude to reduce the bias potential of said input electrode in accordance with the amplitude variations of said signal; said last mentioned means comprising a condenser shunted by resistance means and effectively connected between said cathode and input electrode, and said resistance means having a non-linear and negative impressed voltage-resistance characteristic, whereby the bias established on the input electrode by a signal is maintained after the cessation of said signal and is established at a new value by the next received signal of amplitude different from that of the said bias-establishing signal.

2. A receiver for an impulse carrier wave signal of varying amplitude comprising a vacuum tube having an anode, a cathode and at least one control electrode, means for impressing said signal between said cathode and said control electrode, and an output circuit from said anode, means impressing upon said control electrode a steady bias potential substantially suppressing conductance through said tube in the absence of a signal on said control electrode, means for varying the potential between said cathode and said control electrode in accordance with the amplitude variations of said signal, and means for sustaining said variation of potential after cessation of said signal; said potential-varying means comprising a condenser shunted by resistance means and effectively in series between said cathode and said control electrode, said resistance means having the same conductivity for impressed voltages of opposed polarity and having a non-linear negative impressed voltage-resistance characteristic over a range of amplitudes of impressed signal voltages; whereby said resistance means has a low resistance value during reception of signals and a high resistance value in the absence of a received signal to constitute said means for sustaining said variation of potential.

3. A receiver for an impulse carrier wave signal of varying amplitude, comprising a vacuum tube having a cathode, an anode and control electrode, an input circuit connected between said cathode and said control electrode and an output circuit connected to said anode, a load device in said output circuit operable by the current flow to said anode, means for applying said signal to said input circuit, self-biasing means in said input circuit for varying the bias potential between said cathode and said control electrode by grid current at signal amplitudes above a preselected level, and a condenser in shunt with said self-biasing means and charged by the potential across the same; said self-biasing means comprising resistance means having a non-linear and negative voltage-resistance characteristic with a high resistance value in the absence of a signal input for sustaining the charge of the condenser and a lower resistance value in the presence of and determined by the amplitude of a signal of more than said preselected level.

4. A receiver for an impulse carrier wave signal of varying amplitude, comprising a vacuum tube having a cathode, an anode and a control electrode, an input circuit connected between said cathode and said control electrode, and a load device connected to said anode, said input circuit including resistance means and a condenser in parallel therewith, and means for applying said signal to said input circuit whereby said condenser is charged in the presence of a signal of amplitude above a preselected level at which grid current is established, thereby to vary the bias potential between said cathode and said control electrode, said resistance means having a non-linear and negative voltage-resistance characteristic with a resistance value varying with signal amplitudes above said preselected level, and a high value on cessation of said signal whereby the charge on said condenser is sustained.

5. A receiver for an impulse carrier wave signal of varying amplitude, comprising a vacuum tube having a cathode, an anode and a control electrode, an input circuit connected between said cathode and said control electrode, and a load device connected to said anode, said input circuit including resistance means and a condenser in parallel therewith, means for applying said signal to said input circuit whereby said condenser is charged in the presence of said signal when of amplitude above a preselected level at which grid current is established, thereby to vary the potential between said cathode and said control electrode, said resistance means having a high value in the absence of a signal to maintain a charge on said condenser and having a negative impressed voltage-resistance characteristic, and means additional to said signal applying means for impressing across said resistance a voltage varying with signal amplitude, thereby to lower the effective magnitude of said resistance as a function of the amplitude of said signal.

6. A receiver for an impulse carrier wave signal of varying amplitude, comprising a vacuum tube having a cathode, an anode and control electrode, an input circuit connected between said cathode and said control electrode and an output circuit connected to said anode, a load device in said output circuit operable by the current flow to said anode, means for applying said signal to said input circuit, means imposing a steady bias potential between cathode and control electrode substantially to block conduction through said tube in the absence of a signal input, and self-biasing means in said input circuit to vary the bias potential between cathode and control electrode by grid current and in accordance with amplitude variations of the signal above a preselected level; said self-biasing means comprising a condenser in parallel with resistance means having a negative voltage-resistance characteristic with an effective value in the absence of a signal of a high order of magnitude to sustain the bias potential as established by charging of the condenser by the immediately prior signal and an effective value in the presence of a signal of a lower order of magnitude and varying with the amplitude of the signal.

7. A receiver as claimed in claim 6, wherein said resistance means comprises a bridge of four resistances which each have a negative voltage-resistance characteristic, circuit means connecting one set of opposite terminals of said bridge across said condenser, and voltage means for impressing across the opposite set of bridge terminals a voltage varying in amplitude with the signal.

8. A receiver as claimed in claim 7, wherein said voltage means comprises a transformer coupling to said input circuit.

9. A receiver as claimed in claim 7, wherein said voltage means comprises a transformer coupling to said output circuit.

10. A receiver for an impulse carrier wave signal of varying amplitude, comprising a vacuum tube having a cathode, an anode and a control electrode, an input circuit connected between said cathode and said control electrode, and a load device connected to said anode, said input circuit including resistance means and a condenser in parallel therewith, means for applying said signal to said input circuit whereby said condenser is charged in the presence of said signal to vary the potential between said cathode and said control electrode, said resistance means including a resistance having a non-linear and negative voltage-resistance characteristic with an effective value in the absence of a signal of an order of magnitude to sustain a charge on said condenser on cessation of a signal, and means operative in the presence of a signal to reduce the effective value of said non-linear resistance to a lower order of magnitude; said last mentioned means comprising means coupling said output circuit to said non-linear resistance to impress thereon a voltage which varies with the amplitude of the signal, whereby the effective resistance of said non-linear resistance is varied in accordance with said signal and the charge on said condenser is sustained on cessation of said signal.

11. A receiver for an impulse carrier wave signal of varying amplitude, comprising a vacuum tube having a cathode, an anode and a control electrode, an input circuit connected between said cathode and said control electrode, and a load device connected to said anode, said input circuit including resistance means and a condenser in parallel therewith, means for applying said signal to said input circuit, whereby said condenser is charged in the presence of said signal to vary the potential between said cathode and said control electrode, said resistance means including a resistance having a non-linear and negative voltage-resistance characteristic with an effective value in the absence of a signal of an order of magnitude to sustain a charge on said condenser on cessation of a signal, and means operative in the presence of a signal to reduce the effective value of said non-linear resistance to a lower order of magnitude; said last mentioned means comprising means coupling said output circuit to said non-linear resistance to impress thereon a voltage which varies with the amplitude of the signal, whereby the effective resistance of said non-linear resistance is varied in accordance with said signal and the charge on said condenser is sustained on cessation of said signal.

KENNETH WHITELEY HARRISON.

REFERENCES CITED

The following references are of record in the file of this patent:

UNITED STATES PATENTS

| Number | Name | Date |
|---|---|---|
| 2,068,682 | Keefe | Jan. 26, 1937 |
| 2,135,953 | Weber | Nov. 8, 1938 |
| 2,150,440 | Hargreaves | Mar. 14, 1939 |
| 2,189,925 | Reinken | Feb. 13, 1940 |
| 2,295,297 | Schneider | Sept. 8, 1942 |
| 2,321,618 | Potts | June 15, 1943 |
| 2,331,418 | Nolde | Oct. 12, 1943 |
| 2,393,921 | Mason | Jan. 29, 1946 |
| 2,412,571 | Few | Dec. 17, 1946 |
| 2,443,660 | Large | June 22, 1948 |
| 2,456,970 | MacDonald | Dec. 21, 1948 |
| 2,463,318 | Schneider | Mar. 1, 1949 |

FOREIGN PATENTS

| Number | Country | Date |
|---|---|---|
| 166,892 | Germany | Apr. 9, 1903 |
| 307,318 | Germany | Aug. 14, 1918 |
| 420,100 | Great Britain | Nov. 26, 1934 |
| 533,971 | Great Britain | Feb. 25, 1941 |
| 596,027 | Great Britain | Dec. 24, 1947 |